3,119,693
METHOD FOR PREPARING A DUTCHED COCOA POWDER

Frank P. Colten, Newton, and Agnes J. La Voix, Weymouth, Mass., assignors to General Foods Corporation, White Plains, N.Y., a corporation of Delaware
No Drawing. Filed Aug. 9, 1961, Ser. No. 130,247
5 Claims. (Cl. 99—26)

The present application relates to a new and improved method of producing a cocoa powder suitable for use in chocolate drinks and other beverages where it is desired that the drink be free of sedimentation and suspended cocoa particle specks when a cocoa product is added to the drink.

The use of cocoa in chocolate milk has heretofore presented a problem to the dairy industry. Cocoa normally contains from 3 to 7.5% food fiber which is almost impossible to dissolve. Unless effective preventive measures are applied, the suspended cocoa particles are settled out as an unattractive settlement layer of appreciable thickness which causes inconvenience in serving, and, therefore, the dairy industry has always strived to produce a non-settling chocolate milk.

It is pointed out in "Sommer, Market Milk and Related Products," 3rd Edition, that a number of possibilities have been considered by others in the past in connection with cocoa sedimentation including: (1) elimination of insoluble particles, (2) increased fineness of grinding, (3) increase in the viscosity of the product, and (4) decreasing the difference in density between the suspended particles and the suspending medium.

Several researchers in the past have proposed the elimination of insoluble particles from chocolate milk by allowing sedimentation to take place in the chocolate milk, and then to bottle only the supernatant liquid. However, it was found that this caused a loss in color which was highly undesirable. It has also been proposed to hasten sedimentation by holding the chocolate milk at 140° to 176° F. for about one hour. The supernatant taken after the hour period showed practically no settlement. However, there was a loss in flavor and color of sufficient degree to make the method impractical.

Elimination of insoluble particles has also been employed in the preparation of chocolate syrup by making a dilute syrup to permit filtering or clarifying and then concentrating it in a vacuum pan. However, this method has not met with commercial success to date.

Other researchers have proposed employing a fine grind of cocoa as a means of coping with sedimentation since it is well known that the rate of sedimentation is inversely proportional to the square of the particle sizes. Especially finely ground cocoas are on the market, but this alone does not suffice to meet the problem. Earlier researchers calculated from Stokes' law that the cocoa particles would have been too coarse at a size of 7 microns to stay in suspension 16 hours and 4 microns in size to stay in suspension 48 hours. The researchers assume a density of 1.48 per cocoa particle, a density of 1.06 and a viscosity of 3.5 cps. for the suspending liquid, and a vessel 6" high. It was concluded that other factors must be employed in addition to fineness of grinding.

Homogenization has been tried as a means of reducing the particles to a size sufficiently small to prevent settling. Homogenization of the syrup has been found insufficient; apparently, the fibrous particles are too tough to be subdivided by this process. It appears that homogenization of the finished product actually increases sedimentation and, therefore, the syrup of the dry ingredients is normally added after homogenization.

Most procedures for producing non-settling chocolate milk depend more or less upon an increase in the viscosity of the product through additions of such substances as starch (0.75–1.0%), milk solids, non-fat (5%), gelatin (0.25–0.35%), sodium alginate (0.25) or carragheenin. It has been calculated in the past that with average cocoa particles 20 microns in size a viscosity of 35 cps. is necessary to prevent sedimentation for 19.5 hours. The addition of starch and non-fat milk solids in the form of condensed skim milk has been used in the past to a considerable extent. Where starch is used, a high heat treatment (e.g., 190° F.) was necessary to get the full effect.

While high viscosity gives the chocolate milk product a rich appearance, it causes a filmy aftertaste in the mouth, satisfies the appetite more readily, and tends to limit consumption. A high viscosity, especially when obtained by additions of starch and non-fat milk solids tends to cause scorching when the product is reheated in the home for serving as hot chocolate. Air that is entrapped in high viscosity chocolate milk in the process of bottling is likely to be retained as bubbles in the upper part of the bottle, giving the product the appearance of having undergone gassy fermentation. Where gel formation is involved, syneresis may give the product a wheyed-off appearance. To avoid these undersirable features and defects, the viscosity should be kept as low as possible without obtaining sedimentation. In the past, this has been done through the choice of a finely ground cocoa and a suspending agent that involves other effects besides viscosity. However, the prior art techniques employed in the past have not been too successful since generally either sedimentation or suspended specks are observed after storage.

A normal test in the chocolate industry for cocoa powders which are to be used to prepare chocolate drinks or milk is to suspend cocoa powder in milk having 2% fat to produce a chocolate flavored drink typical of that sold by milk companies. The beverage is normally examined after a period of 20–22 hours to determine whether any of the cocoa has settled out as a sediment or any of the cocoa appears as visible specks suspended in the milk. The appearance of either sedimentation or suspended specks is considered highly undesirable.

Dutched or alkali treated cocoa is very satisfactory for use in chocolate drinks or milk because of its rich, dark color, but unfortunately the dutched cocoas amplify the above-described problems since the dark color produces a more pronounced sedimentation or specking.

It is the object of the present invention to prepare a dutched cocoa powder which when added to milk or a similar beverage will not produce sedimentation or suspended specks after a period of 20–22 hours' storage.

It has now been discovered that the object of the present invention may be obtained by adding approximately 35% water and 2% of an alkali by weight to cocoa nibs. The solution of alkali and water having a temperature of about 120° F.–160° F. is added to the cocoa nibs having a temperature of about 85°–90° F., and the temperature of the mixture is raised to about 120°–160° F., and the nibs are held at such temperature for about 18 hours in a closed system to prevent evaporation of water. The nibs, if not previously roasted, are then roasted, cooled to room temperature, milled to form a chocolate liquor and pressed to obtain a presscake. The presscake is pulverized to obtain a cocoa powder which is tempered by heating to about 120° F. for about 10 minutes, and cooled with continuous shaking until it reaches a temperature of about 55° F. The tempered powder is then screened to obtain the desired end product.

The term "closed system" as used herein refers to any treatment vessel which is enclosed to prevent evaporation of water during the dutching period.

In carrying out the present invention it is preferred to employ puffed or partially roasted nibs, although unroasted or fully roasted nibs may also be employed.

The alkali employed preferably should not be sodium hydroxide as it is too active in the concentrations normally used and produces specks in the end product. Preferably, any of the other alkalis permitted by the Standards of Identity for Chocolate Products (Title 21, U.S.C., part 14—Cacao Products) may be employed, although it is preferred to employ 2% potassium carbonate by weight of the nibs. The potassium carbonate or other alkali is preferably dissolved in a quantity of water of about 35% by weight of the nibs and the mixture of alkali and water, preferably at a temperature of about 140° F., is added to nibs at a temperature of about 85°–90° F. and the temperature of the mixture is raised to about 140° F. and maintained for about 18 hours in a closed treatment vessel. It has been unexpectedly found that in the conventional dutching of cocoa to obtain the desired color suitable for use in milk drinks or other similar beverages, the speck and sedimentation problem of the prior art occurs unless a closed system which prevents loss of moisture due to evaporation during the dutching process is employed. Unexpectedly, it has been discovered that the closed system prevents localized concentration of the alkali with a resulting localized burning of the nibs. The local burning is believed to be the cause of the undesirable specks in the drink. Furthermore, by use of such a system it is possible to obtain a uniform, even dutching. While holding times of more than 18 hours' duration may be employed during dutching, such periods of time normally permit the alkali to overdutch the cocoa with resulting speck formation. It is preferred to employ a temperature of about 120°–160° F. for about 18 hours or less in order to obtain the desired product of the present invention. More preferably a temperature of 140° F. to 160° F. and most preferably 140° F. may be employed for about 18 hours. Temperatures of more than 160° F. are less preferable in that the desired color sought by the dutching process is lost due to a bleaching out effect. Temperatures below 120° F. do not permit sufficient dutching to take place to obtain the desired color.

After the dutching or holding period, the nibs are dried and roasted, if not previously roasted. The nibs after the dutching period have absorbed substantially all of the moisture and require no additional treatment prior to roasting under conventional chocolate roasting conditions. The roasted nibs are immediately cooled to room temperature and then milled to form a chocolate liquor, preferably one having a maximum fineness of 30–40. The chocolate liquor is pressed by any conventional pressing means to obtain a presscake containing 12–15% fat. The presscake is pulverized, preferably so that a particle size distribution wherein 68% passes through a 270 mesh U.S. standard screen and 99% passes through a 300 mesh wet screen is obtained. The pulverized powder is tempered by heating to about 120° F. and held for about 10 minutes at such temperature. The powder is cooled with continuous agitation until it reaches a temperature of about 55° F. If the powder is not cooled to about 55° F., it has been found that it is exceedingly difficult to screen such powder in subsequent processing. The powder which has been cooled to about 55° F. is then screened to obtain powder having a particle size which passes through a 270 mesh U.S. standard screen.

The following example sets forth one embodiment of the present invention.

500 g. of tabasco beans were weighed into a 1200 ml. stainless steel beaker. 25 ml. or 5% water were added and the beans stirred 10 minutes with a mixing spoon until the water penetrated the shell of the bean. The wet beans were puffed in a P & S roaster for 25 minutes at a temperature of 290° F. Hot beans were placed on a cooling tray. Cooling time was 5 minutes. The cooled beans were cracked in a laboratory cracker and the shell separated from the nib in the laboratory fanner at an air setting of 3. 360 g. of 382 g. of nib obtained from the fanner were weighed into a 1200 ml. stainless steel beaker. An alkali solution (7.2 g. $K_2CO_3$ and 120 g. $H_2O$) was heated ot 140° F. and added to the beaker containing the nibs at a temperature of 85° F. A spoon was used to stir the alkali and nibs. Mixing time was 3 minutes. Immediately after mixing, the beaker was covered with a piece of polyethylene wrap and a tight seal made with masking tape. The sealed contained was shaken three times and then placed in a mechanical convection oven, maintained at 140° F. After a period of 30 minutes, the beaker was removed from the oven and shaken to free the nibs that were sticking to the sides and bottom of the beaker. The beaker was returned to the oven and after a period of 18 hours total time in the oven, the beaker was removed and the dutched nibs were taken out of the beaker and roasted in a P & S roaster for 45 minutes at a temperature of 290° F. The hot nibs were cooled 5 minutes in the cooling tray and then put through a hand-operated corn mill. The finely ground nibs were put over Kent rolls 3 times to make a chocolate liquor. The liquor fineness by wet basket wash was 12. Two presscake cakes were made in a Laboratory Carver Press at 20,000 p.s.i.g. to obtain a presscake having a fat content of 14.6%.

The presscakes were broken with a hammer and transferred to a Type W Micropulverizer. A fine screen was used for the operation. The powder obtained was heated in an oven in a glass jar to 120° F. and held at this temperature 10 minutes. The jar was then removed from the oven and rolled until the powder reached 75° F. The time of coling was 35 minutes. Further cooling was done in a cold room until final powder was at 55° F. The cold powder was sieved on a Rotap (Testing Sieve Shaker) U.S. standard screen for 10 minutes. 68% of the powder was 270 mesh. Basket wash fineness using a 300 U.S. standard screen and petroleum ether was 99.82%.

5.5 gms. of the cocoa powder, 28.1 g. sugar, and 0.16 g. stabilizer (chocolate drink type) were added to 500 gm. of milk at 140° F. having a 2% fat content. 10 ml. of water were used to rinse the beaker. The sample was heated to 165° F. in a water bath and the temperature was maintained for 20 minutes and then dropped to 85° F. 45 grams of water were lost by evaporation and were replaced.

The sample was cooled in 15 minutes to 42° F. and then poured into a pre-cooled bottle. Sample bottle was stored in a refrigerator at approximately 38° F. for 20 hours. After 20 hours, the sample was removed from the refrigerator and when a temperature of 48° F. was reached, the sample was evaluated for sediment and suspended specks.

A constant agitation of approximately 120 r.p.m. was maintained during the heating and cooling procedure. After 20 hours storage at 38° F., the milk was free of specks or sedimentation.

While it generally is preferred to employ a small amount of chocolate drink type stabilizer to produce the viscosity desired by the consumer, it is possible in some chocolate drinks to employ the product of the present invention without stabilizers.

While the invention has been described in part by the above example, reference should be had to the appended claims for a definition of the limits of the invention.

What is claimed is:

1. A process for preparing a dutched cocoa powder suitable for use in beverages which comprises adding to cocoa nibs a solution of about 35% water and 2% alkali by weight of said nibs, said solution having a temperature of about 120°–160° F., said nibs being at a temperature of about 85°–90° F., raising the temperature of the mixture of nibs and solution to about 120°–160° F. and holding said mixture without agitation at such temperature for about 18 hours in a closed system, milling said nibs to form a chocolate liquor, pressing said chocolate liquor to obtain a presscake, pulverizing said presscake to produce cocoa powder, tempering said cocoa powder at about 120° F. for about 10 minutes, cooling said tempered cocoa powder to a temperature of about 55° F., and then screening said cocoa powder.

2. A process according to claim 1 wherein the alkali employed is potassium carbonate.

3. A process for preparing a dutched cocoa powder suitable for use in beverages which comprises adding to cocoa nibs a solution of about 35% water and 2% potassium carbonate by weight of said nibs, said solution having a temperature of about 140° F. and said nibs being at a temperature of about 85°–90° F., elevating the temperature of the mixture of nibs and potassium carbonate to about 140° F. and holding said mixture without agitation at such temperature for about 18 hours in a closed system, milling said nibs to form a chocolate liquor, pressing said chocolate liquor to obtain a presscake, pulverizing said presscake to produce a cocoa powder, tempering said cocoa powder at about 120° F. for about 10 minutes, cooling said tempered cocoa powder to a temperature of about 55° F., and then screening said cocoa powder.

4. A process for preparing a dutched cocoa powder suitable for use in beverages which comprises adding to cocoa nibs a solution of about 35% water and 2% alkali by weight of said nibs, said solution having a temperature of about 140°–160° F., said nibs being at a temperature of about 85°–90° F., elevating the temperature of the mixture of nibs and solution to about 140°–160° F. and holding said mixture without agitation at such temperature for about 18 hours in a closed system, milling said nibs to form a chocolate liquor having a maximum fineness of 30–40, pressing the chocolate liquor to obtain a presscake, pulverizing said presscake to obtain cocoa powder having a particle size distribution wherein 68% passes through a 270 U.S. mesh standard screen and 99% passes through a 300 wet screen, tempering the pulverized cocoa powder by heating to 120° F. and holding for about 10 minutes at such temperature, cooling said tempered cocoa powder to a temperature of about 55° F. and screening said cooled cocoa powder to obtain a particle size which passes through a 270 mesh U.S. standard screen.

5. A process for preparing a dutched cocoa powder suitable for use in beverages which comprises adding to cocoa nibs a solution of about 35% water and 2% alkali by weight of said nibs, said solution having a temperature of about 140° F., said nibs being at a temperature of about 85°–90° F., elevating the temperature of the mixture of nibs and solution to about 140° F. and holding said mixture without agitation at such temperature for about 18 hours in a closed system, milling said nibs to form a chocolate liquor having a maximum fineness of 30–40, pressing the chocolate liquor to obtain a presscake, pulverizing said presscake to obtain cocoa powder having a particle size distribution wherein 68% passes through a 270 U.S. mesh standard screen and 99% passes through a 300 wet screen, tempering the pulverized cocoa powder by heating to 120° F. and holding for about 10 minutes at such temperature, cooling said tempered cocoa powder to a temperature of about 55° F. and screening said cooled cocoa powder to obtain a particle size which passes through a 270 mesh U.S. standard screen.

References Cited in the file of this patent

UNITED STATES PATENTS

| 571,238 | Pieper | Nov. 10, 1896 |
| 998,113 | Neumann | July 18, 1911 |

FOREIGN PATENTS

| 3,166 | Great Britain | 1895 |